(12) United States Patent
Talanis et al.

(10) Patent No.: US 7,865,539 B2
(45) Date of Patent: Jan. 4, 2011

(54) DEVICE, ESPECIALLY AN AUTOMATION APPARATUS, WITH A FILE INDEX STRUCTURE STORED IN FILES

(75) Inventors: Thomas Talanis, Heroldsbach (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 10/524,782

(22) PCT Filed: Aug. 5, 2003

(86) PCT No.: PCT/DE03/02631

§ 371 (c)(1),
(2), (4) Date: Feb. 16, 2005

(87) PCT Pub. No.: WO2004/019220

PCT Pub. Date: Mar. 4, 2004

(65) Prior Publication Data

US 2005/0256894 A1 Nov. 17, 2005

(30) Foreign Application Priority Data

Aug. 19, 2002 (DE) ................................ 102 37 875

(51) Int. Cl.
*G06F 12/00* (2006.01)
*G06F 17/30* (2006.01)
(52) U.S. Cl. .................................... 707/829; 707/999.2

(58) Field of Classification Search .................. 707/102, 707/999.001, 999.003, 999.01, 999.102, 707/999.103, 999.107, 829, 999.2
See application file for complete search history.

(56) References Cited

U.S. PATENT DOCUMENTS

| | | | | |
|---|---|---|---|---|
| 5,247,683 A | * | 9/1993 | Holmes et al. | 709/221 |
| 6,029,196 A | * | 2/2000 | Lenz | 709/221 |
| 6,922,707 B2 | * | 7/2005 | Shimojima et al. | 707/999.2 |
| 7,210,039 B2 | * | 4/2007 | Rodgers et al. | 713/182 |
| 2002/0078065 A1 | * | 6/2002 | Agulhon | 707/103 R |
| 2002/0097278 A1 | * | 7/2002 | Mandler et al. | 345/854 |
| 2002/0129000 A1 | * | 9/2002 | Pillai et al. | 707/1 |
| 2003/0220914 A1 | * | 11/2003 | De Angelis et al. | 707/3 |
| 2004/0034853 A1 | * | 2/2004 | Gibbons et al. | 717/174 |
| 2004/0139309 A1 | * | 7/2004 | Gentil et al. | 713/1 |
| 2005/0172124 A1 | * | 8/2005 | Carpentier et al. | 713/165 |
| 2005/0283613 A1 | * | 12/2005 | Carpentier et al. | 713/180 |

FOREIGN PATENT DOCUMENTS

WO  WO 01/18633 A1  3/2001

\* cited by examiner

*Primary Examiner* — John E Breene
*Assistant Examiner* — Phong Nguyen

(57) ABSTRACT

Device and method to represent and/or display a data index structure in an XML file in a very easy manner with the aid of an internet-capable language, especially XML, in automation apparatus, so-called embedded devices, that as a rule do not have their own file index structure and to bringing said data index structure to the embedded device by sending the file so that the target machine can work as a web server thereby enabling remote access.

18 Claims, 4 Drawing Sheets

DEVICE, ESPECIALLY AN AUTOMATION APPARATUS, WITH A FILE INDEX STRUCTURE STORED IN FILES

CROSS REFERENCE TO RELATED APPLICATIONS

This application is the US National Stage of International Application No. PCT/DE2003/002631, filed Aug. 5, 2003 and claims the benefit thereof. The International Application claims the benefits of German application No. 10237875.4 filed Aug. 19, 2002, both applications are incorporated by reference herein in their entirety.

FIELD OF THE INVENTION

The invention relates to an apparatus, in particular an automation device, having a file directory structure which is stored in a file.

BACKGROUND OF THE INVENTION

File directory structures, in particular hierarchical file directory structures, are used inter alia for organizing individual files within a large dataset which is held on a hard disk of a computer, for example, and for finding said files again. A typical example is, for example, the Microsoft® software application Windows Explorer Furthermore, internet technologies such as HTTP, for example, providing the ability to communicate using internet browsers such as Internet Explorer® browser software or Netscape® browser software, for example, are increasingly found in the world of automation engineering. This applies particularly in the field of embedded systems. Embedded systems or embedded devices are understood to be systems with embedded computer functions, such as those which are found in e.g. intelligent sensors and actuators, bus modules, and in many device and machine controllers and in other applications of automation engineering. A range of Web servers is also now available for the field of embedded systems, thereby allowing the automation devices to communicate as appropriate with or via internet/intranet.

All of these Web servers for embedded systems essentially have the same problems. On the one hand, there are limited resources on the target machine or on the automation device concerned, and therefore a file system or a file directory structure is normally absent. Since objects which need to be addressed using internet technologies are addressed by means of a so-called URL (Uniform Resource Locator), and these URLs use a hierarchical structure for addressing as provided by file systems, objects that are located on such embedded systems cannot be readily addressed. On the other hand, however, there is a requirement for remote access to these automation devices or embedded systems, since they normally operate at a distance and are unattended. Remote operation or remote configuration, e.g. in the event of errors, for maintenance purposes, etc., can reduce the presence of personnel on site and is therefore cost-effective. In order to satisfy this requirement, file systems are now being post-implemented at considerable cost, and files then exist as independent storage blocks, for example, which have to be managed e.g. via the so-called FTP service (File Transfer Protocol). In addition to the problem that the management of such individual storage blocks is very burdensome, it is normally also necessary additionally to implement such an FTP server on the embedded system, thereby further reducing the resources on the target machine. Moreover, automation systems which are protected by firewalls are not necessarily open to an FTP server, and remote access is therefore obstructed in some cases.

WO 01 18633 A discloses a system and a method for securely storing and reliably transferring information, and for reliably accessing information using a computer. An algorithm is used for generating a unique identifier (Intrinsic Unique Identifier—IUI) for a file, wherein said identifier is also used for encrypting and decrypting the file. It is proposed to store the unique identifiers of various files together with metadata relating to the files, e.g. file names and file attributes, in a descriptor file. Directory structures can also be represented.

SUMMARY OF THE INVENTION

The present invention addresses the problem of specifying an apparatus which allows an implementation of a file directory structure primarily on embedded systems or automation devices which do not necessarily have a local file directory structure.

This problem is solved by means of an apparatus including a storage for storing a file directory structure, said file directory structure having at least one first hierarchy level and one second hierarchy level which is developed as a subordinate level of the first hierarchy level, having at least one first file directory which is situated on the first hierarchy level, having at least one second file directory which is situated on the second hierarchy level, and having at least one first file which is situated on one of the two hierarchy levels or on a subordinate hierarchy level, in which apparatus the file directory structure is held in a second file, wherein the file directory structure represents part of the content or all of the content of the second file, wherein each file directory and each file of the file directory structure is listed consecutively in the second file, is identified by at least one characteristic start symbol and/or at least one characteristic end symbol, and the contents of each file directory and each file in the file directory structure are stored in each case between the assigned two characteristic symbols.

This problem is solved by a method whereby a hierarchical first file directory structure having at least one first hierarchy level and one second hierarchy level which is developed as a subordinate level of the first hierarchy level, having at least one first file directory which is situated on the first hierarchy level, having at least one second file directory which is situated on the second hierarchy level, and having at least one first file which is situated on one of the two hierarchy levels or on a subordinate hierarchy level, is portrayed in a second file, wherein the second file directory structure, which is copied from the hierarchical first file directory structure, represents part of the content or all of the content of the second file, wherein each file directory and each file of the hierarchical file directory structure that must be portrayed is listed consecutively in the second file, is identified by at least one characteristic start symbol and/or at least one characteristic end symbol, and the contents of each file directory and each file in the file directory structure that must be portrayed are stored in each case between the assigned two characteristic symbols.

In accordance with a preferred embodiment of the invention, an internet-compatible language is used for describing the file directory structure. In accordance with a further preferred embodiment of the invention, the second file, in which the file directory structure is portrayed, is an XML file in which the XML language is used for the purpose of description, in particular of the file directory structure. In addition to XML, of course, other suitable internet-compatible languages can be used if necessary, e.g. HTML/XHTML, CSS, Java Script, CGI/Perl, etc. XML files can be constructed very easily and only require a small amount of storage space. They are also very easy to send remotely via intranet or internet.

In accordance with a further preferred embodiment of the invention, a new line is used for each characteristic start symbol and for each characteristic end symbol in the second file. In this case, a relevant characteristic start symbol can be, for example, the designation of the relevant file directory or of the relevant file, and a relevant characteristic end symbol can be the designation of the relevant file directory or of the relevant file, wherein a predeterminable character is added as a prefix. Such a predeterminable character is the character "/", for example. Of course, it could also be any other character, special character, number, etc. that is desired. Furthermore, the content of each file directory of a hierarchy level of the file directory structure which must be portrayed, including the content of the file directories and files of all subsidiary hierarchy levels of this file directory, is stored between the characteristic start symbol and the characteristic end symbol of the file directory concerned. The portrayal of the hierarchy, including the listing of the relevant contents of the file directories or files, is achieved by means of this bracketing structure between characteristic start symbol and characteristic end symbol for each file directory or file. The so-called "tag" mechanism is used for this purpose in XML, for example. The content of the corresponding file directories or of the relevant files is additionally stored in each case between the characteristic start symbol and the characteristic end symbol of the relevant file directory or relevant file, and consequently a hierarchical file directory, including the relevant contents, is consecutively listed in such a file, e.g. an XML file. At the same time, it is possible selectively and rapidly to access the corresponding contents of the file directories and files, since these are directly addressable by means of the relevant characteristic start symbols or end symbols.

Furthermore, the portrayed file directory structure only represents part of the content of the second file, wherein the start of this part is identified by at least one characteristic start symbol and the end of this part is identified by at least one characteristic end symbol, wherein the portrayed file directory structure is stored between the characteristic start symbol and the characteristic end symbol. For example, the word "BASE" can be identified as the characteristic start symbol for the portrayed file directory structure, and the word "BASE" including an additional prefix of the predeterminable character "/", for example, can be identified as the characteristic end symbol for the portrayed file directory structure. This ensures that the basic file directory structure is separated from any additional information that it may be desirable to include in such an XML file after the file directory structure which is identified in this way.

According to a further preferred embodiment of the invention, in addition to the part containing the portrayed file directory structure, the second file includes further parts having other contents, said further parts being identified or separated in each case by at least one characteristic start symbol and at least one characteristic end symbol. For example, configuration data can be stored in at least one of the further identified parts of the second file, or result codes and/or error codes can be stored in at least one of the further identified parts of the second file. Using such a bracketing structure, provision can be made in the second file to store further characteristic data for the configuration of the relevant embedded systems or automation devices, and/or status signals of the relevant embedded systems or automation devices, in particular result and/or error codes, in separate bracketed parts of the second file, each of which is identified or separated by a corresponding characteristic start symbol and at least one characteristic end symbol.

In this case, the second file is preferably used on a device which does not have its own file directory structure. Since the second file contains a portrayed file directory structure, this replaces the otherwise customary local file directory structure of the device.

Moreover, it is particularly advantageous that the apparatus has means for receiving and/or storing the second file via a communication network, in particular internet and/or intranet and/or a radio connection. As a result of such remotely controlled loading of e.g. an XML file via internet and/or intranet and/or e.g. wirelessly via a radio connection onto an automation device, it is possible to address even extremely distant automation devices without the physical presence of technicians or other personnel on site.

In a further extremely advantageous development of the invention, a configuration of the apparatus using the configuration data in the second file can be carried out automatically after the second file has been loaded onto the apparatus. As a result, automation devices which are physically very distant can easily be configured automatically, thereby significantly reducing the effort and costs associated with the commissioning of said automation devices.

Furthermore, it is very advantageous that the apparatus can be used as a Web server after the second file has been loaded onto the apparatus. Consequently, it is possible directly and remotely to address the embedded device or automation device via the internet or intranet, and therefore the presence of on-site personnel can again be avoided.

In an extremely advantageous development of the invention, an update of the portrayed file directory structure can be carried out by overwriting the original file version of the second file with a new file version. Moreover, an update of the configuration data can be carried out by overwriting the original file version of the second file with a new file version. An update of the configuration data is therefore carried out automatically in this case, whereby current data can be transmitted very quickly to the embedded system or automation device of course, the overwriting of the original file version of the second file with a new file version can be carried out under remote control in this case via internet and/or intranet and/or wirelessly via a corresponding radio connection.

In accordance with a further preferred embodiment of the invention, after the second file has been updated, the previously set configuration data of the apparatus onto which the original file version of the second file was loaded, can automatically be checked and possibly adapted. It is therefore possible to respond very easily and quickly to current changes which indicate the necessity for an adaptation of the configuration data of the automation device and the configuration of the device itself.

It is moreover extremely advantageous for the apparatus to be an embedded device and/or an automation device, and for this apparatus to be used in an automation system.

Moreover, it is particularly advantageous that the disclosed method can be implemented or used in automation systems, in particular for and in packaging machines, presses, plastic molding machines, textile machines, printing machines, machine tools, robots, handling systems, timber processing machines, glass processing machines, ceramic processing machines and lifting gear.

Using the disclosed method, HTML pages, other files and configuration data, etc., for example, which are required for an automation device or embedded device, can therefore be loaded and stored in an automation device in the form of an XML page, for example, whereby such a device can also be used as a Web server. Moreover, it is likewise possible for binary objects, e.g. linked graphics in the HTML pages, to be stored either within the XML page using the so-called BASE 64 encoding method or separately. In this case, the binary objects are accessible from the XML page via a link.

Because the required file directory structure, including file directories and files, e.g. in the form of HTML pages, and their content, is listed within a single XML page, no resource-intensive management of these individual objects is necessary. Furthermore, only standard tools are required for processing such an XML file. The use of proprietary tools, the future availability of which is not necessarily guaranteed, is therefore superfluous.

Furthermore, as disclosed above, a simple configuration of such an automation device which works as a Web server can be carried out very easily using internet-compatible means such as e.g. HTTP instructions. Furthermore, no other services are required. A rapid and flexible expansion and/or modification of e.g. configuration data is possible by means of the remote access, and backwards compatibility is established thus. Using the disclosed method, it is also very easily possible to generate such an XML page, also called a Web site, on a computer locally, e.g. by means of the tool Front Page, to store said page as an XML file, to send it via the internet and/or intranet to the embedded device, to accept the content of the XML file by means of an initial implementation or by overwriting the original XML file, and to carry out all necessary updates. This is also referred to as a publishing mechanism in this case.

The necessity for a hierarchical file directory structure, as required by all Web servers and previously portrayed in another format, is implemented and satisfied using the hierarchical structural means of the XML language, namely the so-called "tags", with the aforementioned advantages.

BRIEF DESCRIPTION OF THE DRAWINGS

Preferred embodiments of the invention are explained in greater detail below with reference to the drawings, in which.

DETAILED DESCRIPTION OF THE INVENTION

Figure 1:
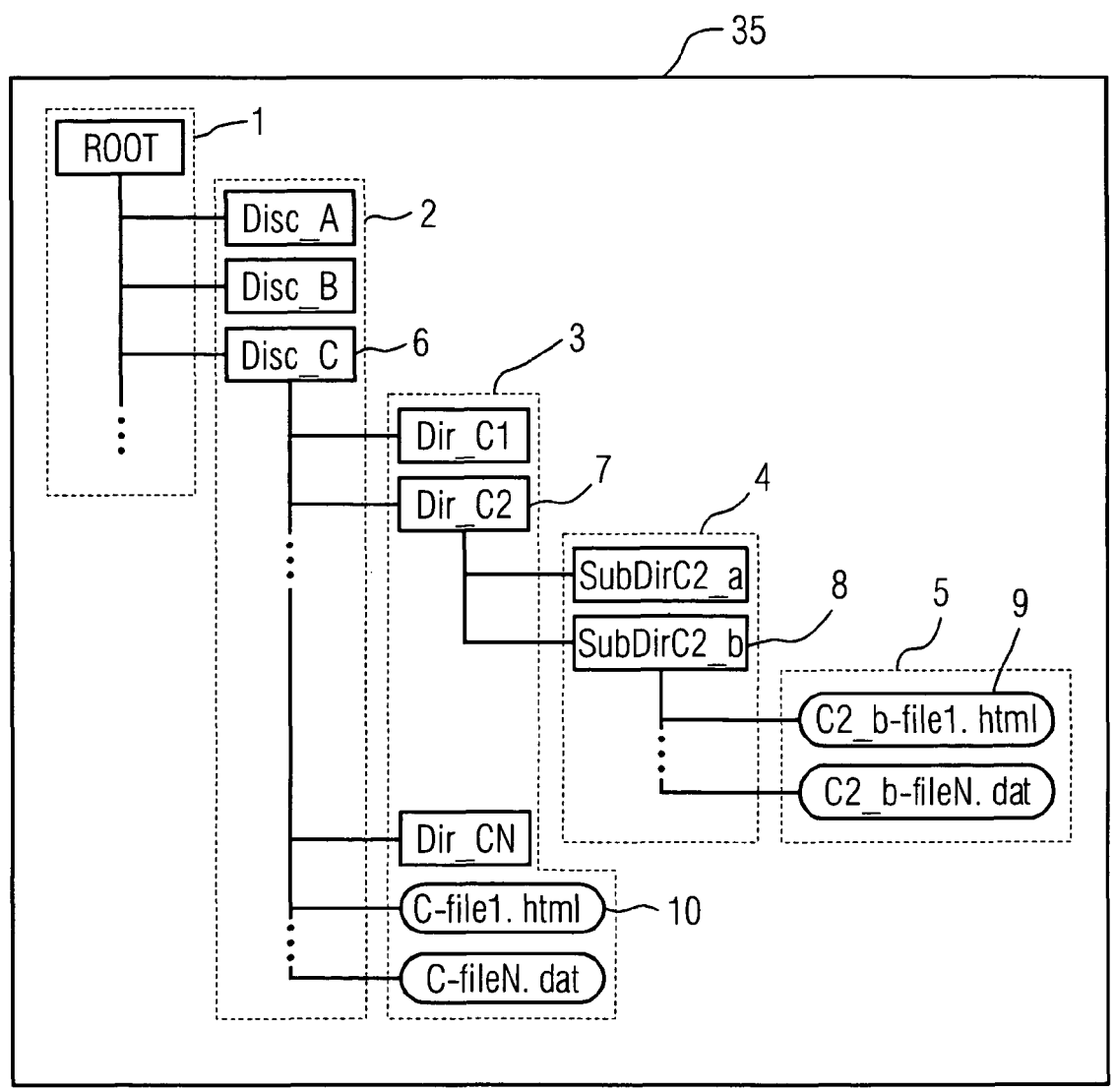
FIG. 1 shows a schematic representation of a conventional hierarchical file directory structure.

FIG. 1 shows the schematic representation of a conventional hierarchical file directory structure 35, also known as a file system. Such a file directory structure 35 consists of a root directory which represents the highest hierarchy level 1 of such a file directory structure 35. All further file subdirectories or files are hierarchically subordinate to the root directory, i.e. the first hierarchy level 1. File directories are shown as rectangles in FIG. 1. Files are shown as ovals, wherein the connection lines between the rectangles or ovals indicate their association with objects or hierarchy levels. The dots which punctuate the connection lines indicate the possibility of unrestricted subdirectory structures. Unrestricted subdirectory structures include both file directories, also simply known as directories, and files.

In the example which is shown here, the second hierarchy level 2 consists of three directories, for example, of which only the directory 6 Disc_C has been labeled for the sake of clarity. These directories might be used here to represent different partitions of a hard disk of any chosen computer, for example. Of course, they can also be used to address drives, i.e. external storage media or peripheral devices of the relevant computer, e.g. floppy disk drives in which floppy disks can be read or CD-ROM drives in which CD-ROMs can be read.

FIG. 1 shows that e.g. the directory 6, namely e.g. the partition Disc_C of a corresponding hard disk, is divided into a plurality of subdirectories which are located on the third hierarchy level 3. Once again, for the sake of clarity, only the subdirectory 7 Dir_C2 has been labeled. It is also evident from FIG. 1 that individual files can also be situated on this level. For reasons of clarity, only the file 10 C-File1.html has been labeled by way of example. Of course, any number of additional files can be located on the third or any other hierarchy level. This is indicated by dots in each case.

In FIG. 1, by way of example, the directory 7 Dir_C2 is further divided into subdirectories which represent the fourth hierarchy level 4. For the sake of clarity, only the subdirectory 8 or SubDirC2_b has been labeled. In the fourth hierarchy level 4, the subdirectory 8 SubDirC2_b is finally subdivided by way of example, giving only files in this example, of which only the file 9 C2_b-file1.html has been labeled for the sake of clarity. These files form the fifth hierarchy level 5 in the present example.

Of course, any further subdirectory structures can be present in any file system, irrespective of the example which is shown here. Even the individual hierarchy levels can include unlimited directories or files. The names of the individual directories or files have also been chosen merely as examples here. They can be labeled using any other names, which can be formed from numbers and/or letters and/or special characters. Objects from a lower hierarchy level therefore form the content of the corresponding associated file directory on the higher hierarchy level. The association is clear from the corresponding lines. For example, therefore, all objects of the third hierarchy level 3 in this example identify the content of the directory 6 Disc_C of the second hierarchy level 2. Other objects of the hierarchy level 2 are not broken down in this example. This is similarly illustrated in the hierarchy levels 3, 4 and 5. For reasons of clarity, the content of an actual file, e.g. the file 9 C2_b-File1.html, has not been shown explicitly.

Figure 2:
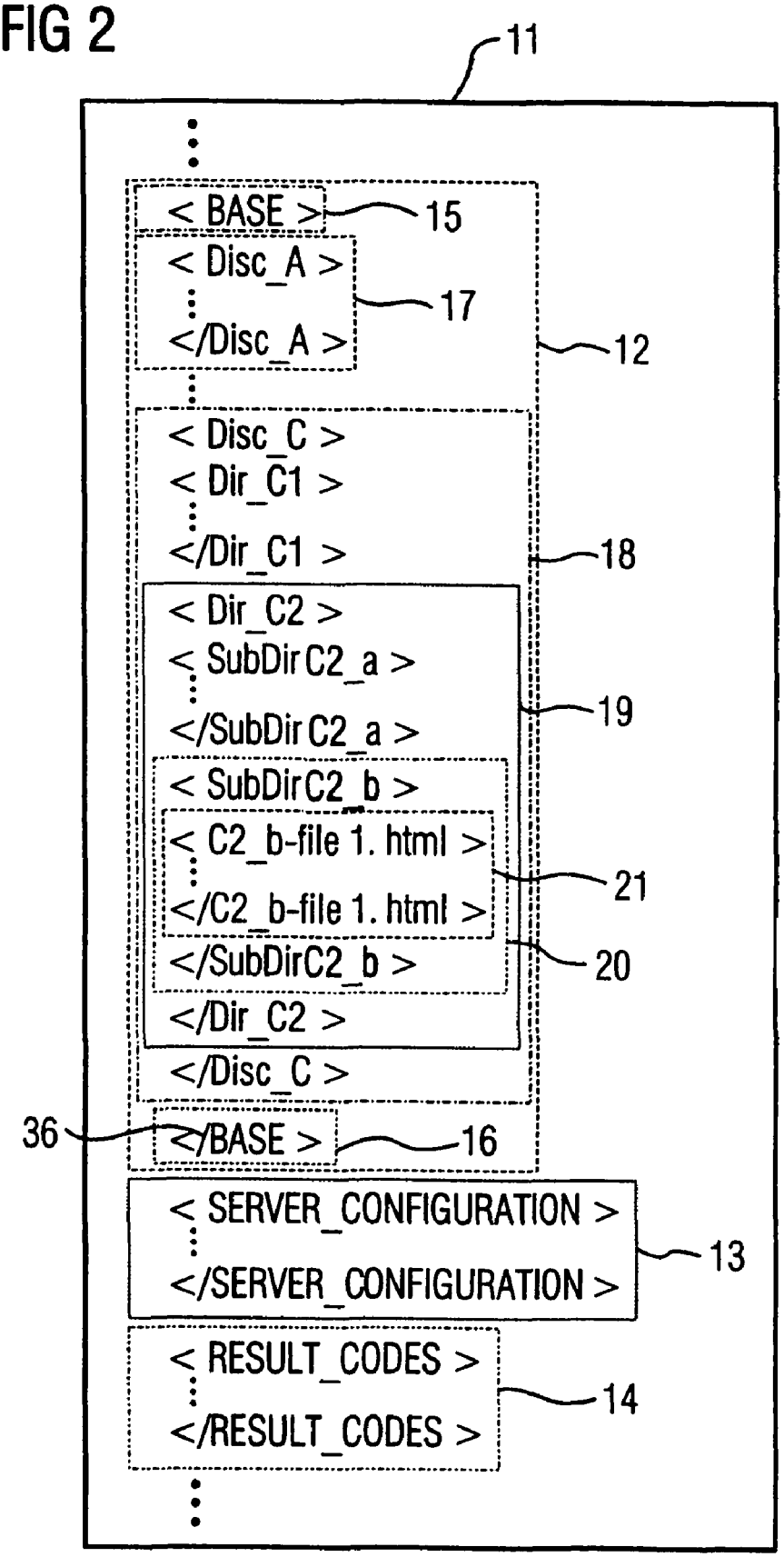
FIG. 2 shows a schematic representation of an XML file with a hierarchical file directory structure.

FIG. 2 shows a file 11 which has been generated in accordance with the invention, and a hierarchical file directory structure 12 which is portrayed in said file. The file 11 is also designated as second file or XML file in the following. In this case, the terms which are used in FIG. 2 relate to the terms from FIG. 1. Of course, the illustration of a file directory structure 12 is also possible without the existence of a physical model of the file directory structure 35 as illustrated in FIG. 1. The illustrated second file 11 is e.g. an XML file and contains e.g. three large main blocks, specifically the portrayed file directory structure 12, the section 13 which is labeled SERVER_CONFIGURATION and which contains e.g. configuration data for an automation device or a Web server, and the section 14 which is labeled RESULT_CODES and in which e.g. result or error codes can be stored, particularly by the automation device or the Web server, and then evaluated via remote access. Of course, further sections can also be stored after the sections 12, 13 and 14 in the file 11, and further necessary data can be held in said further sections. The dots above the section 12 or below the section 14 indicate that further XML files, lines or sections can also be inserted in the file 11. As mentioned above, a hierarchical file directory structure 12 is illustrated by way of example in the file 11.

It is characteristic of the XML language and many internet-compatible languages that each line begins with the character "<", which is followed by the actual content of the line, after which the relevant line is terminated by the character ">". Each of the sections 12, 13, 14 which is shown by way of example in the XML file 11 begins with a characteristic start symbol and ends with a characteristic end symbol. The content of each section is bracketed between these two symbols. The relevant characteristic start symbol and the relevant characteristic end symbol are each given a new line within the XML file. For the purpose of a clear illustration, only the characteristic start symbol 15 and the characteristic end symbol 16 of the hierarchical file directory structure 12 are labeled accordingly. The characteristic start symbol 15 of the portrayed file directory structure 12 has the designation "BASE", for example. So that the end of a corresponding section in an XML file can be identified, the designation that forms the characteristic start symbol 15 of the relevant section is prefixed e.g. by the predeterminable character 36 "/". In principle, however, any other character could be predetermined. In the present example of the portrayed hierarchical file directory structure 12, the characteristic end symbol 16 is the term "BASE", which is prefixed by the character "/". The entire file directory structure 12 which must be portrayed, together with the contents of the relevant directories or subdirectories or files, is then listed and represented between the characteristic start symbol 15 and the characteristic end symbol 16 of the section 12.

Within the file 11 that is shown, the section which identifies the exemplary portrayed file directory structure 12 is therefore composed of different subsections 17, 18, 19, 20 and 21. Accordingly, the subsection 17 which is shown here identifies a directory having the name Disc_A. The dots in the subsection 17 between the characteristic start symbol, which is identified by the designation Disc_A, and the characteristic end symbol, which is identified by the designation /Disc_A, indicate that an optional nested subdirectory or file structure could be located here, but is not shown for reasons of clarity. The characteristic start symbol 15 of the file directory structure 12 symbolizes the highest hierarchy level 1 of the file directory structure 35 from FIG. 1 and therefore corresponds to the root directory. The characteristic start symbol of the subsection 17 having the designation Disc_A symbolizes the beginning of the first object of the second hierarchy level below the root directory.

The characteristic start symbol of the subsection 18 having the designation Disc_C symbolizes the beginning of a further object of the second hierarchy level, below the root directory which is the highest hierarchy level. Subsections 17 and 18 therefore identify objects which are situated on the same hierarchy level below the root directory.

For the sake of clarity, only one subdirectory has been branched further in the subsection 18. This is the subsection 19. The subsection 19 identifies the subdirectory which has the designation Dir_C2, wherein said subdirectory starts with the characteristic start symbol having the same designation and is terminated by the characteristic end symbol /Dir_C2. Between said symbols is again located the entire subdirectory structure or the files that are contained therein, together with the contents of the files, which are located in the subdirectory Dir_C2. The subsection 19 therefore corresponds to an object of the third hierarchy level (cf. FIG. 1).

In order to clarify the possible further branches, the subsections 20 and 21 have also been listed by way of example within the subsection 19 of the file directory structure 12 in the XML file 11. In this case, the subsection 20, which identifies a subdirectory of the directory Dir_C2, begins with the characteristic start symbol SubDirC2_b and terminates with the characteristic end symbol /SubDirC2_b. The content of the subdirectory which is labeled thus is again contained between said symbols. The content of the subdirectory 20 in this example is the subsection 21, which does not feature a further subdirectory but represents an individual file having the designation C2_b_file1.html, wherein said designation also labels the characteristic start symbol. The end of the file is again labeled using the characteristic end symbol /C2_b_file1.html. The dots between the characteristic start symbol and the characteristic end symbol of the subsection 21 are intended to indicate the content of the file, whose reproduction has been omitted however for reasons of clarity. Subsection 20 therefore corresponds to an object of the fourth hierarchy level 4 from FIG. 1, and subsection 21 therefore corresponds to an object of the fifth hierarchy level 5 similarly from FIG. 1.

As a result of using an internet-compatible language, and as a result of using the language XML as shown in the example, it is possible to represent a file directory structure 12 and/or portray any hierarchical file directory structure 35 in a file directory structure 12 within a file 11. The sending of such a file 11 via internet and/or intranet or even via a radio connection, and the receiving of such a file 11 from an embedded device, in particular an automation device, can be achieved very easily and without problems. In order to allow straightforward identification of the individual subsections 17, 18, 19, 20 and 21, the designation of the relevant file directory or of the file that must be portrayed is advantageously used in each case as a characteristic start symbol for each subsection. In order to allow the rapid and straightforward identification of the beginning or the end of any file directory or of any file, it is also advantageous to list at least the characteristic start symbol and the relevant characteristic end symbol on a new line in each case. The content of the file directories or files that must be portrayed thus is then advantageously bracketed between the relevant characteristic start symbol and characteristic end symbol of the objects concerned. The portrayed file directory structure 12 advantageously forms only a part of the XML file 11, which also contains further sections, in particular sections 13 and 14 as mentioned above, but can additionally contain yet further sections. The other sections are likewise advantageously identified by means of a characteristic start symbol, the end again being identified in each case by means of a characteristic end symbol, in order to allow direct addressing via internet and/or intranet. For example, the subdirectory Dir_C2, which also identifies the characteristic start symbol of the subsection 19 in the file directory structure 12 of the XML file 11, can be directly addressed by means of a URL address. Such a URL address has the form "http://Serveraddress/BASE/Disc_C/Dir_C2/SubDirC2_b/", for example. The term "Serveraddress" signifies the designation or address by means of which the relevant automation device, which also works as a Web server, can be addressed and/or specified via internet and/or intranet. The corresponding HTML page or file, namely the page C2_b-File1.html in this example, can be directly addressed and invoked via internet and/or intranet remotely using the full URL address which is cited above. The content of the relevant page which is located in the XML file 11 can therefore be displayed on a physically distant PC, and it is very easy optionally to change and/or analyze, store, overwrite, etc. its content.

Figure 3:
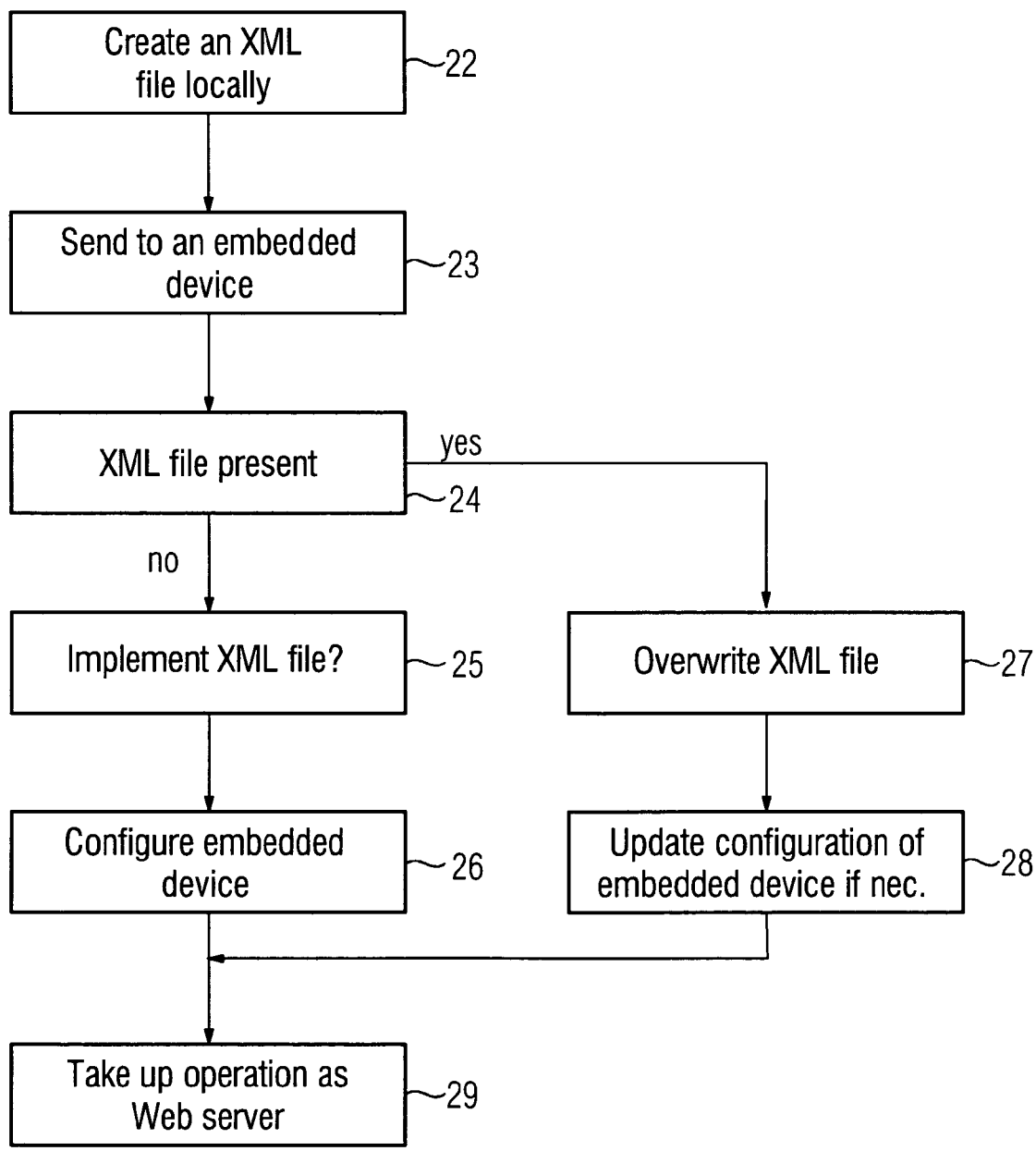
FIG. 3 shows a flow diagram for implementing an XML file.

FIG. 3 shows a flow diagram for implementing an XML file containing a file directory structure 12 on an apparatus in accordance with the invention, in particular on an automation device. As a result of implementing such a file 11, the Web server functionality is additionally transported onto the embedded device concerned. Such an XML file 11 is advantageously installed on an embedded device, in particular an automation device, which does not have its own file directory structure as standard. In step 22, therefore, an XML file 11 is created e.g. locally on any computer and is configured to include the necessary sections, e.g. the file directory structure 12 (cf. FIG. 2), and other sections which contain data that is required for the functionality of a Web server, e.g. section 13 of the XML file 11, which section contains the corresponding configuration data for such a Web server, or yet further sections for any further data that is required. As soon as the exemplary file 11 is complete, in step 23 it is sent via a connected communication network, e.g. internet and/or intranet or even via a suitable radio connection, to an embedded device which is connected to this communication network.

During or following the receipt by the automation device of the file 11, step 24 provides for checking whether a file 11 is already present on the embedded device. If no file 11 is yet present, the sent file 11 is implemented on the corresponding embedded device or automation device in the step 25, and the embedded device is then automatically configured in the step 26 using the configuration data which is available e.g. in the section 13 of the file 11.

If a file 11 is already present on the corresponding automation device, step 27 provides for overwriting the original file 11 using the new i.e. current file 11 which can contain e.g. different current configuration data. In particular, as a result of changed requirements or constraints, the new current file version of the file 11 could also contain a new modified file directory structure if necessary. Step 28 then provides for checking whether the configuration of the corresponding embedded device or of the corresponding automation device must be updated. This might be the case if e.g. new configuration data was sent in the new XML file to the automation device due to current changes. It is advantageous if this update also takes place automatically, after checking whether the corresponding configuration data of the target machine has changed, thereby eliminating the need for the presence on site of maintenance and/or other personnel.

In step 29, the corresponding embedded device or the corresponding automation device can assume the function of Web server and become operational. It is therefore very easy to provide a direct communication via an internet or intranet from a physically distant computer, i.e. a remote connection, and this is cost-effective in terms of maintenance or servicing effort. Such an embedded device can be installed advantageously in any automation system.

Figure 4:
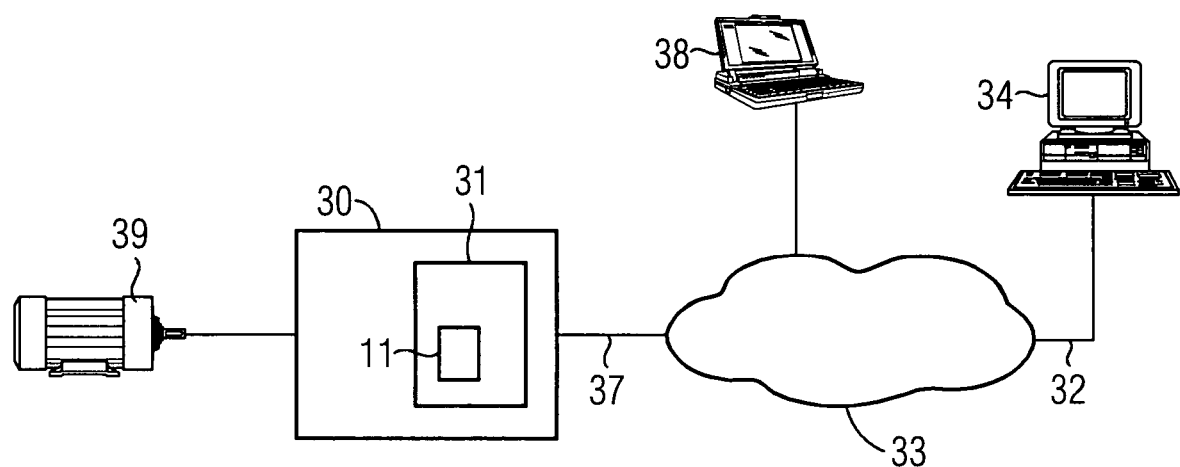
FIG. 4 shows an apparatus in accordance with the invention, including storage and XML file in an automation system.

In accordance with the invention, FIG. 4 shows an automation device 30 including storage 31 and XML file 11 in an automation system. In this case, the automation device 30 represents e.g. an SPC or other control system e.g. for a motor 39, an intelligent sensor, or any other automation device. It is equipped with storage 31 in which a file 11, in particular an XML file, can be stored. The file 11 can be directly loaded into the storage 31 via a possible interface. However, the file 11 is preferably created on a local computer 34, from which it is sent to the automation device 30 by means of a first communication connection 32, via a communication network 33, in particular internet and/or intranet and/or a suitable radio connection, and by means of a second communication connection 37, by means of which the automation device 30 is connected to the communication network 33. In this case, the automation device 30 has means for receiving the file 11 and stores said file in the storage 31 and can then operate as a Web server. The automation device 30 can then be addressed directly by any other participant 38 in the communication system, in particular an automation system. It is therefore possible remotely to access the data which is listed in the individual sections of the file 11. Consequently, this data can be e.g. modified, adapted, read, analyzed, etc. quickly and flexibly by any other participant 38 in the communication system, without the need for corresponding personnel to be present on site for maintenance and/or servicing purposes.

In summary, the present invention relates to an apparatus and a method whereby it is very easy using an internet-compatible language, in particular XML, to display and/or portray within such an XML file 11 a file directory structure 12 on automation devices, or so-called embedded devices, which do not normally have their own file directory structure 12, and to transfer said file directory structure onto the embedded device by sending said file 11, such that the target machine works like a Web server and therefore allows remote access.

The invention claimed is:

1. An apparatus having embedded computer functions for controlling operation of a device, the apparatus comprising:
a communication connection for receiving a first file, wherein the first file is an XML file;
a storage for storing the first file;
wherein the first file is stored in the storage and includes contents of one or more files arranged in a nested manner in accordance with a portrayed file directory structure within the first file itself for addressing contents of the first file in a hierarchical manner;
wherein the portrayed file directory structure operates as a file directory structure for the apparatus without using a separate descriptor file to define the file directory structure or a separate local file directory structure on the apparatus;
wherein the portrayed file directory structure in the first file comprises:
characteristic start symbols and characteristic end symbols to represent each hierarchy levels, wherein the symbols comprise representations of one or more directories, representations of one or more corresponding subdirectories nested therein, and representations of one or more files nested in one or more directories or subdirectories, in a manner representative of a physical hierarchical file directory structure, and
wherein the contents of each file in the portrayed file directory structure are stored between the respective characteristic symbols for each file, thereby allowing directories, subdirectories, and files to be directly addressable by means of the respective characteristic symbols,
said portrayed file directory structure enabling the apparatus to operate as a web server with hierarchical addressing, thereby enabling remote access to control or change operation of the device.

2. The apparatus as claimed in claim 1, wherein an Internet-compatible language is used for describing the portrayed file directory structure.

3. The apparatus as claimed in claim 1, wherein the XML language of the first file, in which the portrayed file directory structure is stored, is used for the purpose of describing the portrayed file directory structure.

4. The apparatus as claimed in claim 1, wherein a new line is used both for each characteristic start symbol and for each characteristic end symbol.

5. The apparatus as claimed in claim 1, wherein the designation of the relevant file directory or of the relevant file is used as a characteristic start symbol, and the designation of the relevant file directory or of the relevant file is used as a characteristic end symbol and a predeterminable character is added as a prefix.

6. The apparatus as claimed in claim 1, wherein the first file includes further sections having other contents, said further sections being identified or separated in each case by at least one characteristic start symbol and at least one characteristic end symbol.

7. The apparatus as claimed in claim 6, wherein configuration data is stored in at least one of the further sections.

8. The apparatus as claimed in claim 6, wherein one or more of result codes and/or error codes are stored in at least one of the further sections.

9. The apparatus as claimed in claim 1, wherein the apparatus comprises a mechanism for receiving the first file via a communication network.

10. The apparatus as claimed in claim 9, wherein the communication network comprises one or more of an Internet, an Intranet, and a radio connection.

11. The apparatus as claimed in claim 7, wherein a configuration of the apparatus, using the configuration data, can be carried out automatically after the first file has been loaded onto the apparatus.

12. The apparatus as claimed in claim 1, wherein the content of one or more of the files in the portrayed file directory structure is capable of being remotely addressed using a full Uniform Resource Language URL address in accordance with the file's location in the portrayed file directory structure and being displayed as a webpage on a remote device.

13. The apparatus as claimed in claim 1, wherein an update of the portrayed file directory structure comprises overwriting an original file version of the first file with a new file version.

14. The apparatus as claimed in claim 7, wherein an update of the configuration data comprises overwriting an original file version of the first file with a new file version.

15. The apparatus as claimed in claim 7, wherein after the first file has been updated, a previously set configuration data of the apparatus onto which the original file version of the first file was loaded, is automatically checked and adapted.

16. The apparatus as claimed in claim 1, wherein the apparatus is an embedded device.

17. The apparatus as claimed in claim 1, wherein the apparatus is an automation device.

18. An automation system having at least one apparatus as claimed in claim 1.

\* \* \* \* \*